United States Patent
Rong et al.

(10) Patent No.: US 8,542,579 B2
(45) Date of Patent: Sep. 24, 2013

(54) METHOD AND SYSTEM FOR COOPERATIVE TRANSMISSION IN WIRELESS MULTI-HOP NETWORKS

(75) Inventors: Beiyu Rong, Austin, TX (US); Anthony Ephremides, Rockville, MD (US)

(73) Assignee: University of Maryland, College Park, MD (US)

( * ) Notice: Subject to any disclaimer, the term of this patent is extended or adjusted under 35 U.S.C. 154(b) by 408 days.

(21) Appl. No.: 12/948,520

(22) Filed: Nov. 17, 2010

(65) Prior Publication Data

US 2012/0250494 A1  Oct. 4, 2012

Related U.S. Application Data

(60) Provisional application No. 61/261,867, filed on Nov. 17, 2009.

(51) Int. Cl.
| | |
|---|---|
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2011.01) |

(52) U.S. Cl.
USPC .................. 370/229; 370/395.21; 370/395.4; 370/412

(58) Field of Classification Search
USPC .............. 370/229–235, 395.2, 395.21, 395.4, 370/395.41, 395.42
See application file for complete search history.

(56) References Cited

U.S. PATENT DOCUMENTS

| | | | | |
|---|---|---|---|---|
| 6,731,648 | B1* | 5/2004 | Cotter | 370/458 |
| 2002/0196749 | A1* | 12/2002 | Eyuboglu et al. | 370/328 |
| 2007/0076740 | A1* | 4/2007 | Manjeshwar | 370/432 |
| 2007/0162559 | A1* | 7/2007 | Biswas et al. | 709/216 |
| 2009/0234908 | A1* | 9/2009 | Reyhner et al. | 709/203 |
| 2010/0232436 | A1* | 9/2010 | Fujii et al. | 370/400 |

OTHER PUBLICATIONS

G. Foschini and M. Gans, "On Limits of Wireless Communications in a Fading Environment when Using Multiple Antennas," Wireless Personal Communications, vol. 6 pp. 311-335, 1998.

I. Telatar, "Capacity of Multi-antenna Gaussian Channels," Eur. Trans. Telecommun., vol. 10, No. 6, pp. 585-595k Nov./Dec. 1999.

A. Sendonaris, E. Erkip, and B. Aazhang, "User Cooperation Diversity—Part I: System Description," IEEE Trans. Commun., vol. 51, pp. 1927-1938, Nov. 2003.

(Continued)

*Primary Examiner* — Xavier Wong
(74) *Attorney, Agent, or Firm* — Rosenberg, Klein & Lee

(57) ABSTRACT

User cooperation in wireless networks implemented on the Network Protocol layer level attains a higher stable throughput and improved transmission delay. The cooperation is designed between a set of source user nodes transmitting to a common destination, where users with channels providing a higher successful delivery probability, in addition to their own traffic, relay packets of other source users whose transmissions to the destination fails. Each source user node is provided with an ample queue buffer having capacity to accumulate packets inadvertently received from other users in the system in addition to its own packets. Ranking mechanism facilitates in determining the "quality" of wireless channels, and the Acknowledgement mechanism facilitates in coordination of the transmissions in the system. The nodes exchange information on the queues status, and decision is made by a scheduling controller on the priority of transmission.

21 Claims, 9 Drawing Sheets

(56) References Cited

OTHER PUBLICATIONS

A. Sendonaris, E. Erkip, and B. Aazhang, "User Cooperation Diversity—Part II: Implementation Aspects and Performance Analysis," IEEE Trans. Commun., vol. 51, pp. 1939-1948, Nov. 2003.

J.N. Laneman, D.N.C. Tse, and G.W. Wornell, "Cooperative Diversity in Wireless Networks: Efficient Protocols and Outage Behavior," IEEE Trans. Inform. Theory, vol. 50, pp. 3062-3080, Dec. 2004.

G. Kramer, M. Gastpar, and P. Gupta, "Cooperative Strategies and Capacity Theorems for Relay Networks," IEEE Trans. Inform. Theory, vol. 51, No. 9 pp. 3037-3063, Sep. 2005.

G. Kramer, I. Maric, and R.D. Yates, Cooperative Communications, vol. 1, No. 3-4,. "Foundations and Trends in Networking", Hanover, MA: NOW Publishers Inc., 2006, pp. 271-425.

A. Host-Madsen, "Capacity Bounds for Cooperative Diversity," IEEE Trans. Inform. Theory, vol. 52, No. 4, pp. 1522-1544, Apr. 2006.

A. S. Avestimehr and D.N.C. Tse, "Outage Capacity of the Fading Relay Channel in the Low SNR Regime," IEEE Trans. Inform. Theory, vol. 53, No. 4, pp. 1401-1415, Apr. 2007.

A. K. Sadek, et al. in the publication "Cognitive Multiple Access Via Cooperation: Protocol Design and Performance Analysis," IEEE Trans. Inform. Theory, vol. 53, No. 10, pp. 3677-3697, Oct. 2007.

S. Biswas, et al., "Opportunistic Routing in Multi-Hop Wireless Networks", ACM SIGCOMM, vol. 34, No. 1, pp. 69-74, Jan. 2004.

\* cited by examiner

METHOD AND SYSTEM FOR COOPERATIVE TRANSMISSION IN WIRELESS MULTI-HOP NETWORKS

REFERENCE TO THE RELATED PATENT APPLICATIONS

The present Utility Patent Application is based on the Provisional Patent Application Ser. No. 61/261,867 filed Nov. 17, 2009.

The U.S. Government has certain rights to the invention. The work was funded by Army Research Office under Contract Number W911NF0510246.

FIELD OF THE INVENTION

The present invention relates to wireless networks, and more in particular, to cooperative transmission in wireless networks with enhanced spatial diversity realized at the Network Protocol Layer level.

More in particular, the present invention is directed to cooperative transmission in wireless networks in a manner which counteracts the effects of fading, shadowing, attenuation and interference of wireless communication channels, and which capitalize on the properties of the wireless medium to enhance transmission rate and quality through the use of a concept of multi-hop relaying among source user nodes where a packet is delivered to the destination node through either a direct link between the packet generating source user node and the destination, or through multi-hop relaying by intermediate source users which have an increased probability of successful delivery if the intended packet delivery fails.

In overall concept, the present invention is directed to a novel technique to enhance transmission rate and transmission quality in wireless network environments through cooperative relaying of the messages at the network protocol layer level by a source user node having a channel with the highest successful delivery probability among a set of source user nodes with better channels than a respective transmitting source user node and which decoded the packet unicasted from the transmitting source user node, and which assumes the relaying function in addition to its own traffic related functions.

Additionally, the present invention is directed to a cooperative transmission in wireless networks implemented on the network protocol layer level but which may be cross-linked to other layers of the Open System Interconnection (OSI) model including, for example the Physical Layer, Media Access Control (MAC) Layer, etc., to further contribute to the performance gains provided by each layer of the cooperation implementation.

BACKGROUND OF THE INVENTION

Various developments in the area of wireless communication have proven that cooperative communication enhances performance in wireless environments. The idea of cooperative transmission emerged from the realization that spatial diversity may counteract the effects of fading, shadowing, attenuation and interference of wireless communication channels. For example, as presented in G. Foschini and M. Gans, "On limits of wireless communications in a fading environment when using multiple antennas," Wireless Pers. Commun., pp. 311-335, 1998; and I. Telatar, "Capacity of multi-antenna Gaussian channels," Eur. Trans. Telecommun., vol. 10, no. 6, pp. 585-595k November/December 1999, spatial diversity was achieved in single communication links via the use of multiple antennas.

However, in wireless networks, the effect of multiple antennas may be realized through the combined use of antenna resources of different nodes. This observation lead to the notion of message relaying presented, for example, in A. Sendonaris, E. Erkip, and B. Aazhang, "User cooperation diversity—Part I: system description," IEEE Trans. Commun., vol. 51, pp. 1927-1938. November 2003; A. Sendonaris, E. Erkip, and B. Aazhang. "User cooperation diversity—Part II: implementation aspects and performance analysis," IEEE Trans. Commun., vol. 51, pp. 1939-1948. November 2003; J. N. Laneman, D. N. C. Tse, and G. W. Wornell, "Cooperative diversity in wireless networks: efficient protocols and outage behavior," IEEE Trans. Inform. Theory, vol. 50, pp. 3062-3080, December 2004; G. Kramer, M. Gastpar, and P. Gupta, "Cooperative strategies and capacity theorems for relay networks," IEEE Trans. Inform. Theory, vol. 51, no. 9 pp. 3037-3063, September 2005; G. Kramer, I. Marie, and R. D. Yates, Cooperative Communications, vol. 1, no. 3-4. "Foundations and Trends in Networking", Flanover, Mass.: NOW Publishers Inc., 2006; A. Host-Madsen, "Capacity bounds for cooperative diversity," IEEE Trans. Inform. Theory, fol. 52, no, 4, pp. 1522-1544. April 2006; and A. S. Avestirnehr and D. N. C. Tse. "Outage capacity of the fading relay channel in the low-SNR regime," IEEE Trans. Inform. Theory, vol. 53, no. 4, pp. 1401-1415. April 2007.

The message relaying concept recently has received a great deal of attention. Most of the work on cooperative relaying has been focused on the Physical Layer, which is an actual hardware layer (lowest layer) in the Open Systems Interconnection (OSI) reference model. This model is a seven layer architecture arranged from the lower levels starting with the Physical Layer to the higher levels, including in order a Data Link Layer (which includes the Logical Linc Control (LLC) and Media Access Control (MAC) sub-layers), a Network Layer, a Transport Layer, a Session Layer, a Presentation Layer, and an Application Layer.

A. K. Sadek, et al. in the publication "Cognitive multiple access via cooperation: protocol design and performance analysis," IEEE Trans. Inform. Theory, vol. 53, no. 10, pp. 3677-3697, October 2007, have provided the evidence that performance gains may be achieved even when the cooperation scheme is implemented at the Network Protocol Layer level. The Network Protocol Layer is the IP (Internet Protocol) supporting layer which routes messages (packets) across the network boundaries using the best path available between the source host to the destination host based on their addresses.

In Sadek, et al., a relay node is placed in between the source nodes and the destination node to relay packets from the source nodes. The system thus introduces extra relay nodes which merely perform a relaying function for the source nodes, thereby burdening the system with pure relays.

The extra pure relay node may not always be available. Moreover, in order for Sadek, et al.'s relaying method to attain performance improvement for all source nodes, the relay node must have a better channel to the destination than all the source nodes. This has never been suggested in Sadek, et al.

A concept was studied in S. Biswas, et al., "Opportunistic routing in multi-hop wireless networks", ACM SIGCOMM, vol. 34, no. 1, pp. 69-74, January 2004, which selects the best user among network users to relay the packet. However, the publication focuses on characterizing the total number of transmissions required to deliver a single packet between a pair of nodes, and therefore does not address the scheduling problem within a wireless network, since there is only a single packet at any one time in the network. No suggestion or analysis has been presented in S. Biswas, et al. for the case where the intermediate relay nodes would also have their own packets to deliver. In addition, the results of the analysis are based solely on simulation.

It is therefore would be highly desirable to provide a cooperative transmission technique in a more realistic environment where all source nodes are active participants transmitting their own packets and relaying packets of other source nodes with a lesser quality of the channels, and where multiple packets coexist is the system.

SUMMARY OF THE INVENTION

It is therefore an object of the present invention to provide a wireless multi-access network system with cooperative transmission feature having improved stable throughput and delay performance in which a set of source user nodes generate their packets to deliver to a common destination and which cooperate at the Network Protocol Layer level in a manner where the source users with better wireless communication channels to the destination are responsible, in addition to transmitting their own traffic, for relaying packets inadvertently received from users that have wireless communication channels of a lesser quality if these packets are not successfully received at the destination.

In one aspect of the present invention, there is provided a method for cooperative transmission in wireless networks in which the source user nodes are ordered according to the quality of their channels to the destination node. The channel quality may be represented by the successful delivery probability. The source user node with a better channel to the destination node is assigned with a higher index. In the subject multi-access system, a source user node 1 has the worst channel to the destination node, a source user node 2 has the second worst channel to the destination node, and every subsequent source user node i is progressively "better" than source user node (i−1), A source user node N has the best channel to the destination node. All source user nodes are notified of their rank.

Specifically, the subject method comprises the following steps:

forming a wireless multi-access system which includes a plurality N of source user nodes each generating and unicasting their respective packets to the destination node N+1, and cooperatively operating the wireless multi-access system at the Network Protocol Layer level by:

transmitting at least one i-class packet from at least one source user node i to the destination node N+1 through the wireless communicating channel i, and, if the destination node N+1 fails to successfully receive the packet transmitted by the current transmitting source user node i, but there are some source user nodes from the set {i+1, i+2, N} (which are source user nodes that have higher successful probability than source user node i) that successfully decode the transmitted packet, then a source user node j with the largest index, e.g. with the highest successful delivery probability among the source user nodes that successfully decoded the transmitted packet, will queue that packet for relaying at a later time. All other source user nodes which successfully decoded the transmitted packet will drop that packet.

The method further includes the steps of broadcasting acknowledgement signals either by the destination node N+1 or by the source user nodes j which receive the i-class packet transmitted by the source user node i.

In the method, each source user node j maintains a total of j virtual queues including a virtual queue i (for i=1, 2, ..., j−1) which stores packets that are originally generated by source user node i. Each source user node j will relay some packets transmitted by source user i (for i=1, 2, ..., j−1) in lieu of its own packets. The queuing of the i-class packets and j-class packets accumulated in the source user node j, is properly coordinated by a priority establishing mechanism.

An acknowledgement feedback mechanism is provided to inform the transmitters and the listening source user nodes, whether the transmitted packet is successfully decoded by the destination, or by some of the subsequent source user nodes. Then, the transmitter will decide whether to drop the packet or keep the packet in its queue. The subject cooperation protocol may be performed in determining which subsequent source user node to relay that packet.

When source user node i transmits a packet, it may be any of the i classes of packets, class-1, class-2, ..., class-(j−1). Upon receiving the acknowledgement signal, either from the destination node N+1 or from any of the source user nodes whose index is greater than i on the successful receipt of the packet, the transmitting user node i discards the transmitted packet.

For source user nodes with index less than i, no action will be taken by these source user nodes. For a source user node j, with j>i, if it does not decode the packet, no action will be taken. If the node j successfully decodes the packet transmitted by source user node i, then it will still discard the packet upon the receipt of the acknowledgement from the destination node N+1, or from any of the source user node with index greater than j. The user node j will keep the packet for relaying otherwise.

If, however, no acknowledgement signals are sent from the destination node, or from any of is subsequent source user nodes with index greater than i, the transmitted packet by source user node i will remain at the source user node i for retransmission.

The method further comprises the step of providing the buffers (virtual queues) at source user node j which contain the class-j packets generated by source user node j itself, and additional (j−1) number of buffers, which contain a total number of (j−1) classes of packets, with the i-th class of packet originally generated by source user node i, for i=1, 2, ..., j−2, j−1. These source user nodes i, for i=1, 2, ..., j−2, j−1 have a lesser probability of successful delivery to the destination node than the source user node j does.

Transmission among all classes of packets from the source user node j may be coordinated in various manners. The packet generally is allowed to be randomly chosen for transmission from any of the j buffers respective to j classes of packets at the source user node j, when the source user node j is to transmit. At each time slot, it is defined by the medium access scheduling policy which source user node will transmit. As for the case of conflict-free work-conserving mode of operation, at any time slot, (a) only one source user node which has packets in its queue will be activated to transmit, and (b) whenever there is at least one source user node that has packets in its queue, there will be a source user node activated for transmission. Alternatively, in a Time-Division-Multiple-Access (TDMA)-based schedule, there are respective time slots allocated for each of the source user nodes. Source user nodes transmit in their allocated time slots. The allocated time slot is idled if the corresponding source user node is empty.

In a further alternative mode of operation, the transmission of the i and j-class packets from the source user node j may be performed by assigning a higher priority to either i or j-class packets, or by assigning a higher priority to either the source user node i or source user node j, based on various criteria which may include: provision of a stable throughput, maximum throughput, system traffic delay, waiting time in the queues of the source user node j, class of service, desired priority policy, capacity of the queues in the source user node j, queue overflow threshold, etc., and combinations thereof.

The method further includes the steps of exchanging information on the queue(s) status between the source user nodes in the system and, subsequently, making decision on the packets transmission schedule either for different source user nodes, or for different class packets in the same source user node.

The decision on the transmission schedule may be made in the system either at the source user nodes themselves, or by a system scheduling controller unit (also referred to herein as Cooperative Operation Controller) which is operatively coupled to all source user nodes in the system as well as to the destination nodes.

A Priority Establishing Mechanism, an Acknowledgment Mechanism, as well as a Channels Ranking Mechanism are coupled both to the Cooperative Operation controller and to the source user nodes in the system to facilitate in coordination of the cooperative transmission of packets.

The present invention in a further aspect is a wireless multi-hop network system with an improved stable throughput and delay performance which comprises a wireless multi-access system of a plurality of interconnected source user nodes, each connected to a destination node N+1 via a respective wireless communication channel to unicast thereto respective packets, as well as a cooperative scheduling controller unit implemented at the Network Protocol Layer level of the wireless multi-access system and operatively coupled to the plurality N of the source user nodes and the destination node N+1.

All the N source user nodes generate their own packets to be finally delivered to the common destination node N+1, and the packets that are generated by source user node i are denoted by class-i packets. The source user nodes are ordered such that source user nodes with higher index have a higher successful delivery probability of their respective channel to the destination node. So if j>i, the source user node j has a higher successful delivery probability through its direct link to the destination than source user node i has.

The Cooperative Scheduling Controller Unit instructs whether and which source user to relay the transmitted packet, if the destination fails to successfully receive the transmitted packet sent thereto from a source user node.

In order to "handle" the j-class packets generated thereat, as well as i-class packets inadvertently received due to the wireless nature of the network, the source user node j is provided with the i-queue unit with a buffer capacity sufficient to accumulate i-class packets from all participants i having a lesser delivery probability than the node j, and a dedicated j-queue with a buffer of a sufficient capacity for accumulating j-class packets generated at the source user node j. The Cooperative Scheduling Controller Unit is operatively coupled to the source user node j to coordinate transmission of the i-class packets and j-class packets from the i-queue and j-queue to the destination node via the wireless communication channel j in accordance with a predefined priority criteria.

The subject wireless multi-hop network system further comprises an Acknowledgement (ACK) mechanism which includes ACK transmitters at each source user node j and the destination node N+1. The destination node will broadcast acknowledgment signals upon successful receipt of any packet. The source user node j will broadcast acknowledgement signals upon successful receipt of packets transmitted by those user nodes i which have a lesser successful delivery probability (that is, those i that is less than j).

When a source user node i transmits a packet, if the destination node does not successfully decode the packet, but there are some user nodes from the set {i+1, i+2, . . . , N} that successfully decode the packet, then, in the case where there are more than one source user node in this set decode the transmitted packet by source user node i, the Cooperative Scheduling Controller Unit appoints a single source user node, that has the highest successful delivery probability among those that decode the packet, to keep this transmitted packet in its queue for relaying at a later time.

The wireless multi-hop system of the present invention further includes a cross-layer unit by which the protocol implemented at the Network Protocol Layer level is interconnected with scheduling mechanisms implemented at the Medium Access Layer, and the rank among users that are determined by the physical-layer channel properties, etc.

These and other features and advantages of the present invention will be apparent from the following detailed description taken in conjunction with accompanying Patent Drawings.

DETAILED DESCRIPTION OF THE PREFERRED EMBODIMENTS

Figure 1:
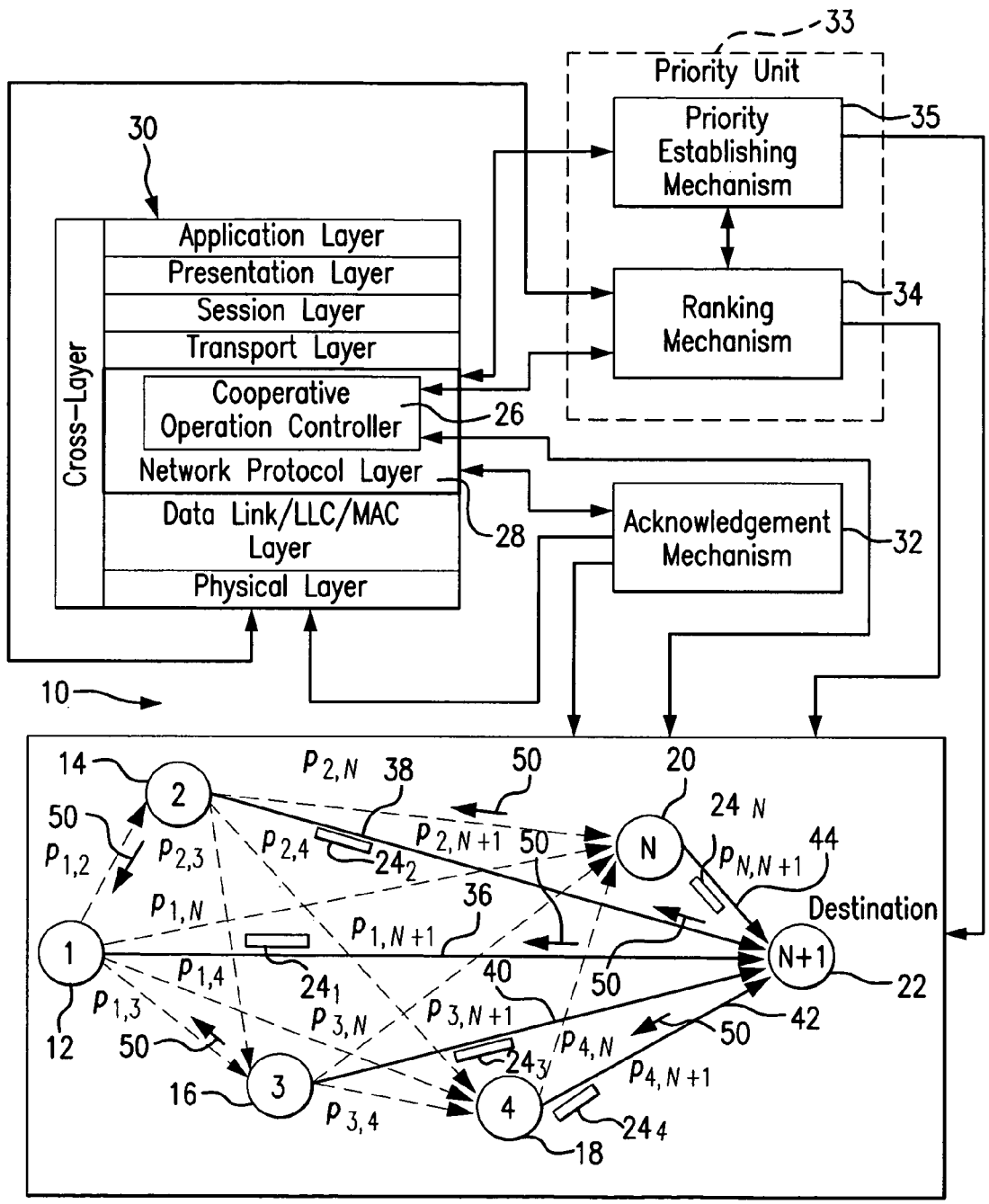
FIG. 1 is a schematic representation of the wireless multi-access system of the present invention.

Referring to FIG. 1, a wireless multi-access system 10 of the present invention includes a plurality N of wirelessly interconnected source user nodes 12, 14, 16, 18, and 20, and a destination node 22 to which the source user nodes 12-20 unicast packets 24 generated at the respective source user nodes 12-20. Although only nodes 12, 14, 16, 18, and 20 are shown in FIG. 1, it is to be understood that a larger or smaller number of the source user nodes may participate in the multi-access wireless system 10 of the present invention.

A Cooperative Scheduling Controller Unit, also referred to herein as a Cooperative Operation Controller 26, is schematically shown in FIG. 1 as being implemented at the Network Protocol Layer 28 of the Open System Interconnection (OSI) reference model 30. It is to be understood that the functions of the Cooperative Operation Controller Unit 26 includes, among others, the coordination of the packets transmission through the wireless network in accordance with the subject cooperative strategy, and may be implemented as a separate controller entity. Alternatively, its functions may be performed by the source user nodes 12-20 by themselves. Thus, either being designed as a main system controller, or residing on each of the source user nodes 12-20 and the destination node, the cooperative schedule controller unit 26 controls the operation of the wireless multi-access system 10. For these purpose, the controller 6 includes an Acknowledgement mechanism 32, and a Priority nit 33 which incorporates a Ranking Mechanism 34, as well as a Establishing Mechanism 35. The mechanisms 32, 34, 35 are schematically shown as separate entities, but they also may be implemented at the source user nodes 12-20 level as well. The mechanism 32, 34 and 35 are functionally and operationally interrelated, and operated in accord with the Cooperative Operation Controller 26, as will be presented in detail infra herein.

In the wireless multi-access system 10, there always exist source nodes that have a better channel to the destination than others. Motivated by this fact, a new network-level cooperation system has been developed which is presented herein and which implements cooperation among a plurality source user nodes 12-20. This concept is implemented in the N-user multi-access system 10 where a total of N source user nodes 12-20 unicast to the common destination node 22 via their respective wireless communication channels 36, 38, 40, 42, and 44, which constitute direct links between the above-mentioned nodes 12-20 and the destination node 22.

In FIG. 1, the node 12 is shown as the "farthest" node from the destination node 22, and every subsequent node i (14, 16, 18, and 20) is progressively "closer" to the destination. The node 20 is shown as the "closest" to the destination node 22. This distance notion may either be represented as real distance in free-space communication, or a "virtual distance" that also includes all types of fading, as will be detailed infra herein.

For the purposes of better reflecting the "furtherness" or "closeness" of each source unit node 12-20 relative to the destination node 22, these notions will be further referred to herein intermittently as a channel rank, or a successful packet delivery probability of respective wireless communication channels 36-44 of the source user nodes 12-20. Therefore a node j, where j=2, 3, 4, ..., N, is considered to have a better channel to the destination node 22 than a node i does, where i=1, 2, ..., j−1, e.g., the node 20 has the best channel rank, or the highest successful delivery probability, among other source user nodes in the network.

In the present system 10, the source user nodes 14-20 accept responsibility of relaying packets for other source users 12-18, respectively, which have a lesser channel rank, in addition to handling their own traffic. This achieves substantial performance improvement without the cost of an extra node, e.g., of a pure relay node.

The subject cooperation concept further involves multi-hop relaying. Characterization of the stable throughput region with multi-hop relaying, will be presented further herein.

The erasure channel model between any two nodes is assumed in the subject system, so that a packet may be successfully decoded with a certain probability. This captures the effects of fading and attenuation at the Physical Layer, as well as the wireless multicast advantage. Under this model, nodes which are "closer" to the destination node have a higher successful probability to deliver a packet to the destination.

In addition, the erasure channel model permits all source user nodes 12-20 in the network to have some capability to decode a transmitted packet. Thus, the option is provided for the source user node j to relay packets of its predecessor nodes i=1, 2, ..., (j−1) in lieu of its own packets if the transmission of these predecessor source user nodes i to the destination node N+1 is unsuccessful but correctly received by the node j.

Although it is possible to transmit packets of different lengths, for the sake of simplicity, it is assumed that packets of fixed length are generated at source user nodes according to some random stationary processes and are queued for transmission to the destination node 22, so that the queues may be emptied with a positive probability. As will be presented in detail infra, the packet generation rate region will be described by stable throughput region. The stable throughput region is defined as the set of all arrival rate vectors (in packets/slot) to the sources such that all queues in the network 10 remain bounded.

For the work-conserving policies, as well as Time-Division-Multiple-Access (TDMA) policy, considered at the medium access control (MAC) layer, the analytical expressions for the stable throughput region are derived for the N-user wireless multi-access system 10 shown in FIG. 1. It has been shown that by following the subject cooperation strategies, all source user nodes may simultaneously increase their stable throughput rates by assuming the relay functions in addition to the source user functions.

Figure 6:
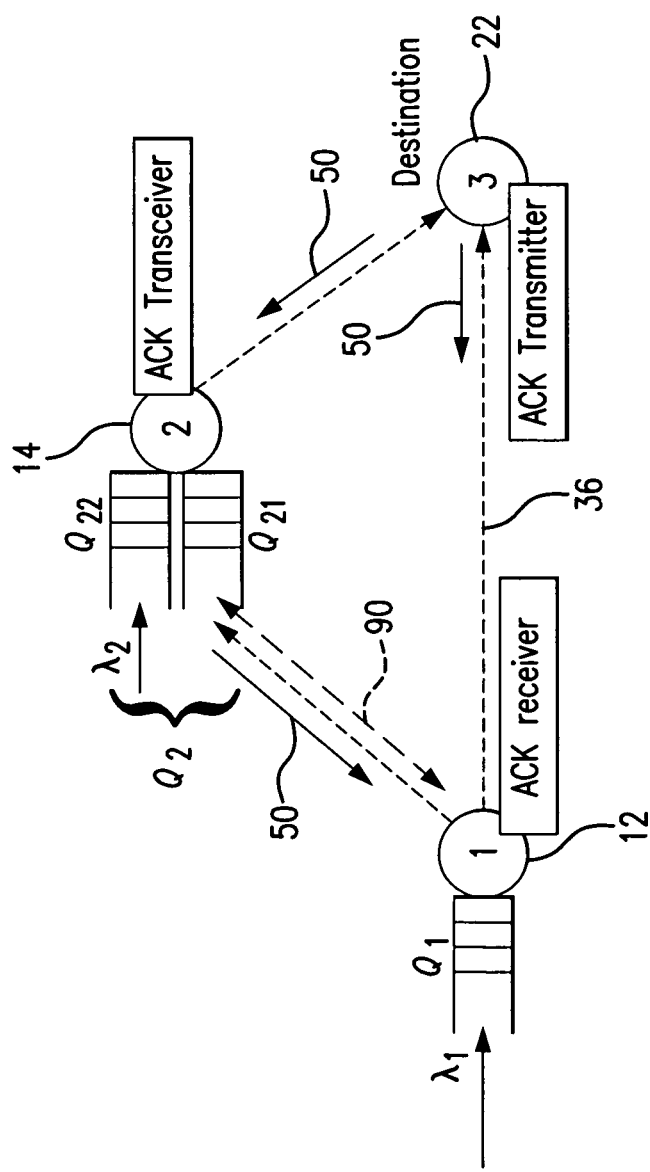
FIG. 6 is a schematic representation of the two-user case as a portion of the wireless multi-access system of the present invention shown in FIGS. 1 and 3.

The analytical expressions are derived for the delay performance of the two-user case, shown in FIG. 6, as a portion of the network presented in FIG. 1, under both the TDMA-based policy and priority-based policy, which is a special case of the work-conserving policy. The analysis reveals that the subject cooperation strategy leads to a reduced delay for both users. Further, due to a large number of interacting queues of the source user nodes operating as the source nodes for trafficking their own packets and as relays for transmitting the packets inadvertently received for other source user nodes, the methodology used in the subject Application is quite sophisticated and complex.

System Model

In the slotted multi-access system shown in FIG. 1, the source nodes 12-20, identified also as nodes 1, 2, ..., N, unicast traffic to a common destination node (N+1).

Each source user node i of the source user nodes 12-20 generates i-class packets 24 according to a Bernoulli process with rate $\lambda_i$ to be transmitted to the destination node 22 over their direct link therewith. The node 12 generates 1-class packets $24_1$ to be transmitted over the channel 36. The node 14 generates 2-class packets $24_2$ to be transmitted via the channel 38, etc.

The Bernoulli process is a finite or infinite sequence of binary random variables, and is thus a discrete-time stochastic process that takes only two values, canonically "0" and "1". The component Bernoulli variables $X_i$ are identical and independent. Thus, the Bernoulli processes are independent from source user node to source user node, and independently and identically distributed over time slots. Packets $24_i$ generated by node i classifies as i-class packets. It is assumed that a channel with fading and attenuation also includes the effects of additive white Gaussian noise.

When the source user node i transmits a packet with power P, the probability that a source user node j may decode the packet is given by $$p_{i,j} = P\left[\frac{|h_{i,j}|^2 P}{N_0} > \gamma\right] \quad \text{(Eq. 1)}$$

where
$h_{ij}$ is the channel gain from node I to node j,
$N_o$ is the noise poser level at the receiver j, and
$\gamma$ is the Signal-to-Noise Ration (SNR) threshold required for correct decoding.

Packets which are not successfully decoded, are discarded immediately. The channel gain parameter may either be distance-dependent only, as in free-space communication, or it may include the effects of different types of fading represented by a random variable.

Figure 3:
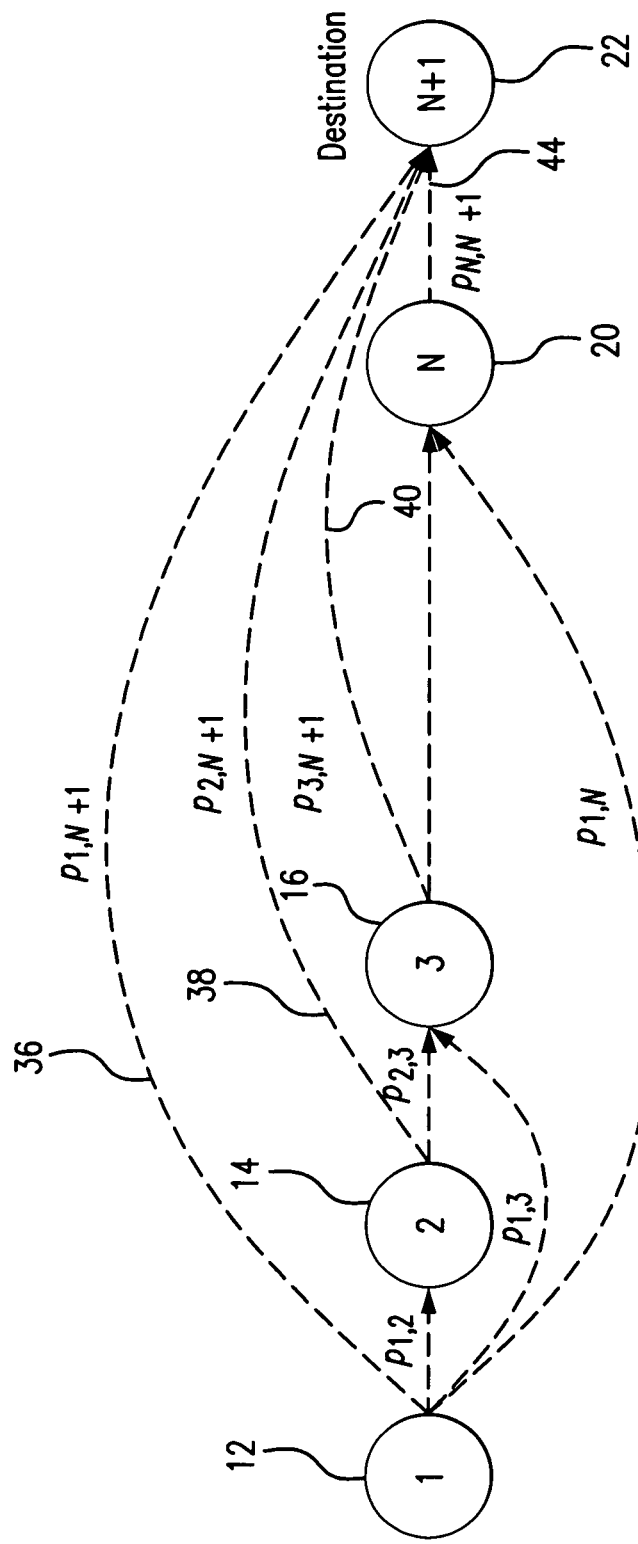
FIG. 3 is a schematic representation of the "Tandem" model representation of the system of the present invention.

Channels in the system are assumed independent. It is also assumed that the source user nodes "closer" to the destination have a higher successful delivery probability, therefore, $p_{N, N+1} > p_{N-1, N+1} > \ldots > p_{1, N+1}$ as illustrated in FIGS. 1 and 3.

The reception probabilities $p_{ij}$ are used herein to evaluate the performance of the subject system. It is also assumed that acknowledgements (ACKs), to be discussed in detail further herein, are instantaneous and error-free, and all source user nodes in the system "hear" the ACK signals. This relatively strong assumption is necessary and common for packet communication and establishes upper bounds to performance for both cooperative and non-cooperative cases.

Based on the afore-presented model, the subject Cooperation Strategy has been implemented in the system shown in FIG. 1. When a source user node trans s a packet generated thereat, if the destination node (N+1) successfully decodes the packet, it broadcasts an ACK signal, and every other source user node "hears" it.

Upon successful delivery of the packet to the destination node, the packet exits the systems. Otherwise, if the destination node does not decode the packet, but some source user nodes j from the set $\{i+1, i+2, \ldots, N\}$ decode the packet, the source user node with the highest quality rank among them (that is the source user node with the best channel to the destination among those that decode the packet) will keep the packet and take the responsibility to forward the packet, while all other source user nodes will then "drop" that packet. In further paragraphs, the source user node i will be considered to have a lesser channel rank than the source user node j, e.g. the source user nodes j may inadvertently receive i-class packets from the source user nodes i for relaying to the destination node.

Properly coordinated opera ion of the system 10 may be implemented if any of i's subsequent source user node that decodes the packet generates the ACK signals 50. Broadcasting of ACK signals 50 upon receipt of a packet is controlled by the Acknowledgement mechanism 3 which, as shown in FIG. 6, includes an ACK transmitter at each source user node 14, 16, 18, and 20, and the destination user node 22 for broadcasting an ACK signal 50 upon receipt of a packet. The ACK mechanism also includes an ACK receiver at each of the source user nodes 12-20 for "hearing" the ACK signals 50.

The ACK mechanism operates under the control of the Cooperative Operation Controller 26 to greatly contribute to coordination of the transmission of different class packets through the entire system 10.

Figure 2:
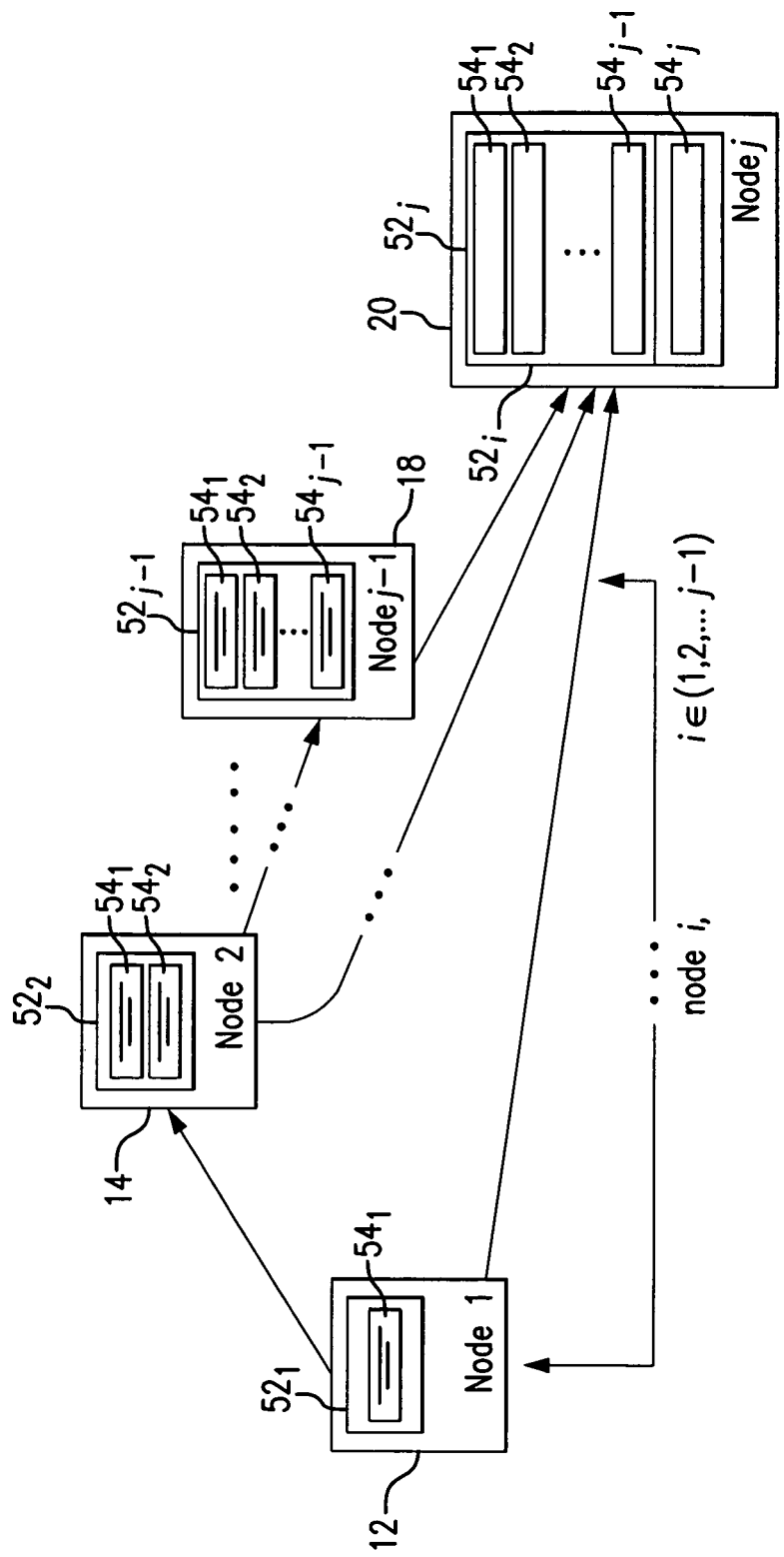
FIG. 2 is a schematic representation of the queues arrangement of the source user nodes in the system of the present invention.

By checking all the ACKs, if a source user node finds itself to be the node with the highest rank, it stores the packet in the buffer 54 of its queue 52, as will be presented further herein with reference to FIGS. 2 and 6. Otherwise, it drops the packet. Finally, if neither the destination node nor any of i's subsequent source user nodes decodes the packet, the packet remains at i's queue for retransmission. With this form of cooperation, except node 1 which only transmits packets generated by itself, every other node j, for $2 \leq j \leq N$, will forward some packets from all its "predecessor" e.g., lower rank nodes i in addition to its own packets.

The subject cooperation strategy requires all N source user nodes to exchange the ACK information. Considering that only one bit is needed for each ACK to indicate successful reception, the cooperation overhead becomes negligible, and the overhead may be easily incorporated into the system analysis without affecting the results in a substantial manner.

The subject cooperation strategy has the effect of concentrating packets from different sources i, where $i \in (1, \ldots, j-1)$, into fewer "virtual queues", at each source user node j, where $j \in (2, \ldots, N)$, where the packets in j's queue comprise a total number of (j−1) classes of relayed packets received at the source user node j plus the j-queue for the j-class packets generated at the source user node j. Given the option to schedule among multiple classes of packets, or perform inter-session network coding, the performance limit that may be approached must be an upper bound to that it can be achieved in the non-cooperative case, where packets of different classes are separated in different queues.

As shown schematically in FIG. 2, the node 12 has a queue 52, which includes a single queue buffer 54, accumulating 1-class packets generated at the source user node 12. The node 14 which has a better channel rank than the node 12, and therefore is considered for relaying the 1-class packets of the node 12, if needed, has its queue $52_2$ (which includes two virtual queues, e.g. implemented with the queue buffer $54_1$), for accumulating 1-class packets generated and transmitted by the node 14 (but unsuccessfully delivered to the destination node 22) and the queue buffer $54_2$ for accumulating 2-class packets generated at the node 14. Likewise, the source user node 18, which is the j−1 node, is provided with the queue $52j−1$ which includes j−1 virtual queues having queue buffers $54_1, 54_2, \ldots, 54_{j-1}$ for accumulating i-class packets, e.g. 1-class packets, 2-class packets, ..., (j−1)-class packets generated at the respective i nodes 1, 2, ..., j−1, but undelivered to the destination node.

The node 20, e.g. node j, which has the best probability of the successful packet delivery to the destination node in comparison with any of the group i source user nodes (i=1, 2, ..., j−1) is best "positioned" for the relaying function than any of the nodes 1, 2, ..., j−1. For relaying purposes, the node j is provided with the queue $52_j$ implemented with virtual queue $52_i$ formed with the queue buffers $54_1, 54_2, \ldots, 54_{j-1}$. In addition, the queue $52_j$ of the node j has a queue buffer $54_j$ for accumulating the j-class packets generated at the node j. It is clear that the queues of the nodes in the system which may accept relaying responsibilities may need to have high capacity queue buffers for storage of different classes packets transmitted through the network.

The following three steps define the proposed cooperation protocols:

Step 1: Determine the Priority Order of the Source User Nodes.

The priority order is determined by the priority unit 33 which includes the Ranking Mechanism 34 which establishes the quality of the channel from each source user node to the destination node. The source user node with a better channel to the destination node is assigned a higher index. All source user nodes in the system 10 are notified of established priority order.

As will be presented further herein, in addition to the channel rank the priority order may also need to be established based on various priority criteria which are established by the Priority Establishing Mechanism 35. For example, the priority of transmission of different classes of packets from the node may be based on a fullness of a respective queue buffer in the node.

In order to establish the priority order based on the channel quality, the Ranking Mechanism 34 instructs the system to generate pilot messages which, at the beginning of the cooperative transmission, are exchanged between the source user nodes and the destination node to estimate the user-destination channel qualities. All source user nodes will then be notified of their channel rank in the network. In the system 10, shown in FIG. 1, the source user node 1 has the worst channel to the destination node, user 2 has the second worst channel to the destination, and every subsequent node i is progressively "better" than node (i−1). The source user node N has the best channel to the destination node N+1.

For example, in the model of the present invention shown in FIG. 3, the priority order assigned to the source user nodes 12, 14, 16, . . . , 20 is as follows: N>N−1 . . . >2>1. This model is a "Tandem" model incorporating N sources with a single common destination. The packet reception probability is described by Eq. 1 previously presented.

The following steps 2 and 3 will be described herein in conjunction with the flow-charts presented in FIGS. 4 and 5 of decisions and actions taken by each source user node as instructed by the Cooperative Operation Controller 26, after the source user node k has attempted a transmission.

It is to be understood that after the source user node k transmits a packet from one of its virtual queues, no actions are taken at user for $1 \leq j \leq k-1$.

Figure 4:
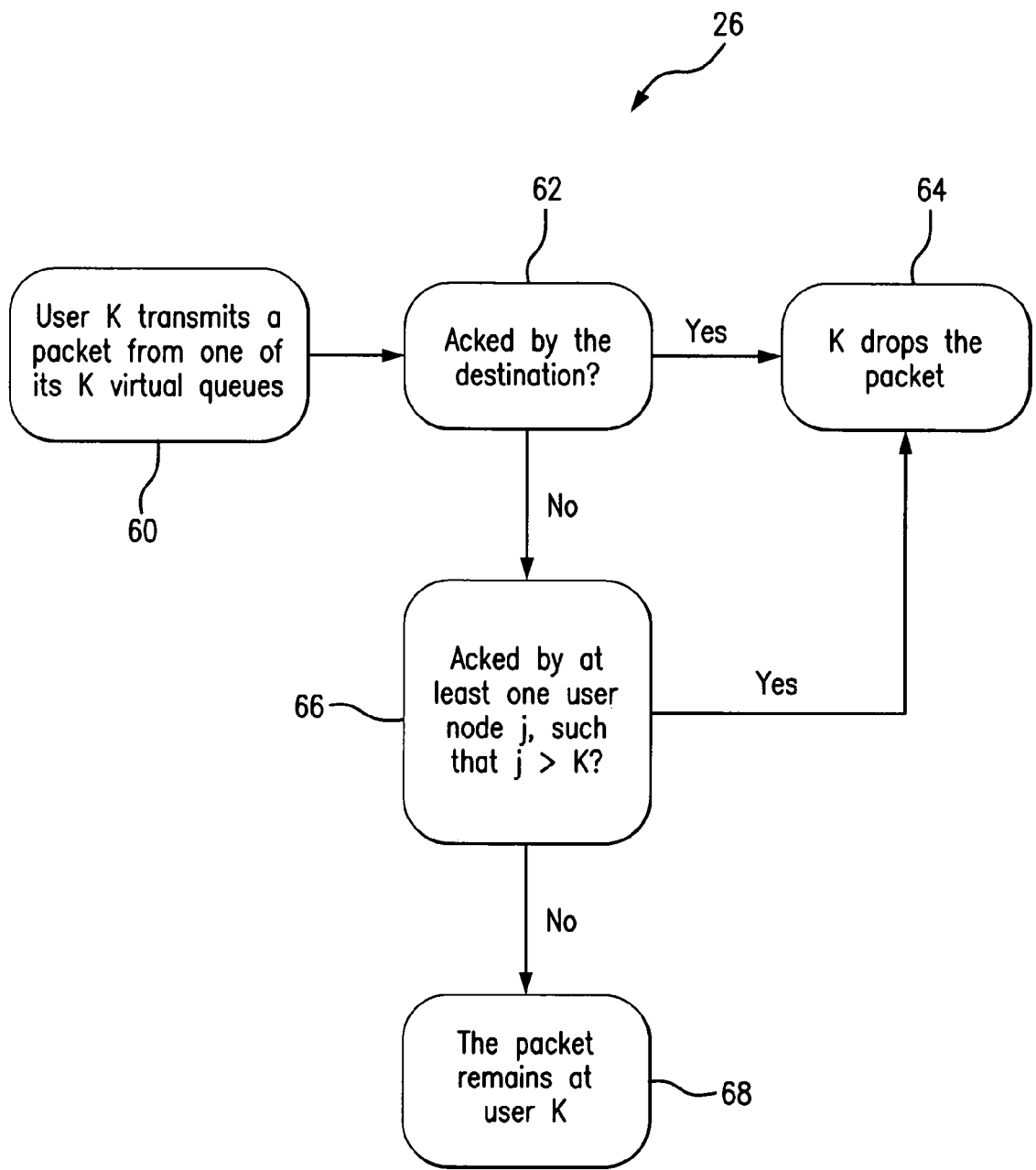
FIG. 4 is a flow chart diagram of the decisions and actions process taken by the source user node i as instructed by the Cooperative Operation Controller upon an attempt of transmission by the source user node i.

Step 2:

Referring to FIG. 4, in block 60, at an assigned time slot, when it is the source user node K's turn to transmit (K∈{1, 2 . . . N}) the user K transmits a packet from its queue 52. As presented in previous paragraphs, the queue 52 at the source user node K consists of a total number of K virtual queues $54_1$, $54_2$, . . . , $54_i$, $54_j$, . . . , $54_k$, where the $j^{th}$ (j=1, 2, . . . , K) virtual queue $54_j$ stores the j-class packets originally generated by user j, and virtual queue $54_k$ stores k-class packets generated by the source user node k. Since each user k is adapted to store packets from all source user nodes with a lesser rank of the channel, it is provided with a queue buffer of ample capacity, preferably infinite size buffer. When the source user node K transmits a packet, generally user K can arbitrarily choose a packet from one of the K virtual queues $54_1$, $54_2$, . . . , $54_k$.

Alternatively, the source user node k may have a priority for transmission of the packets received thereat from source user nodes of a lower rank. There may be priority criteria established for packet transmission by the Priority Establishing Mechanism 35, which may include, but not limited to, stable throughput, maximum throughput, system traffic delay, waiting time in the queues, capacity of the queues, overflow threshold of the queues, class of service, specific priority policy, etc. Based on these criteria, the mechanism 35 may establish the priority for the order of access communication channels by source user nodes in the system. It should be understood that the Ranking Mechanism 34 and the Priority Establishing Mechanism 35 decide on the priority, order together, and operate in conjunction with the controller 26.

In conjunction with the Priority Establishing Mechanism 35 and the Ranking Mechanism 34, the Cooperative Scheduling Controller Unit 26, (either residing on the source user nodes, or built as a separate entity), establishes priority policies, and operates the system in lieu of the priority criteria, thus controlling the operation of the system 10.

There are two issues which the Cooperative Scheduling Controller Unit 26 considers when instructing nodes to operate: (1) which node to transmit, and (2) which virtual queue to serve at the transmitting node.

Regarding the issue (1), both conflict-free work-conserving policies and Time-Division-Multiple-Access policies (TDMA) are considered further herein. A specific Medium Access Control (MAC) policy is to decide which source user node is to access the channel at a time slot so that the stable throughput performance is not deteriorated.

According to the conflict-free work-conserving policy, as long as only one backlogged user is activated at each time slot and no time slot will be wasted (if there are packets in the system), any deterministic or probabilistic policy (or even arbitrary policy) in selecting one backlogged user to transmit may achieve a satisfactory stable throughput performance.

According to the TDMA policy, users are assigned to transmit in disjoint fractions of time slot, and user K transmits in its assigned time slots. But different policies in deciding which user to transmit may affect the delay performance of the entire system.

Regarding the issue (2), it has been shown that the priority policy in deciding which virtual queue to serve at a source user node does not affect the stable throughput region. However, the priority policy will affect the delay performance of individual packet class.

Step 3:

At the end of the time slot of user K's transmission, source user nodes will perform different actions according to their rank in the network. Specifically, (a) referring to FIG. 4, the source user node K in block 62, the source user node K checks if the destination node sends back an acknowledgement (ACK) message indicating successful reception. If the acknowledgement message is received, the packet is dropped by user K in block 64, and there is no further action needed for user K.

If the acknowledgement message is not received, the following action will be commanded by the controller unit 26:

In block 66, the source user node K checks if there is ACK from any of K's subsequent nodes, that is, if ACKs were sent by at least one node j, with j>K. If so, the logic passes to block 64, and the packet is dropped by user K. If not, the flow chart passes to block 68 instructing the node K to keep the packet in its own queue $54_k$ for retransmission.

Figure 5:
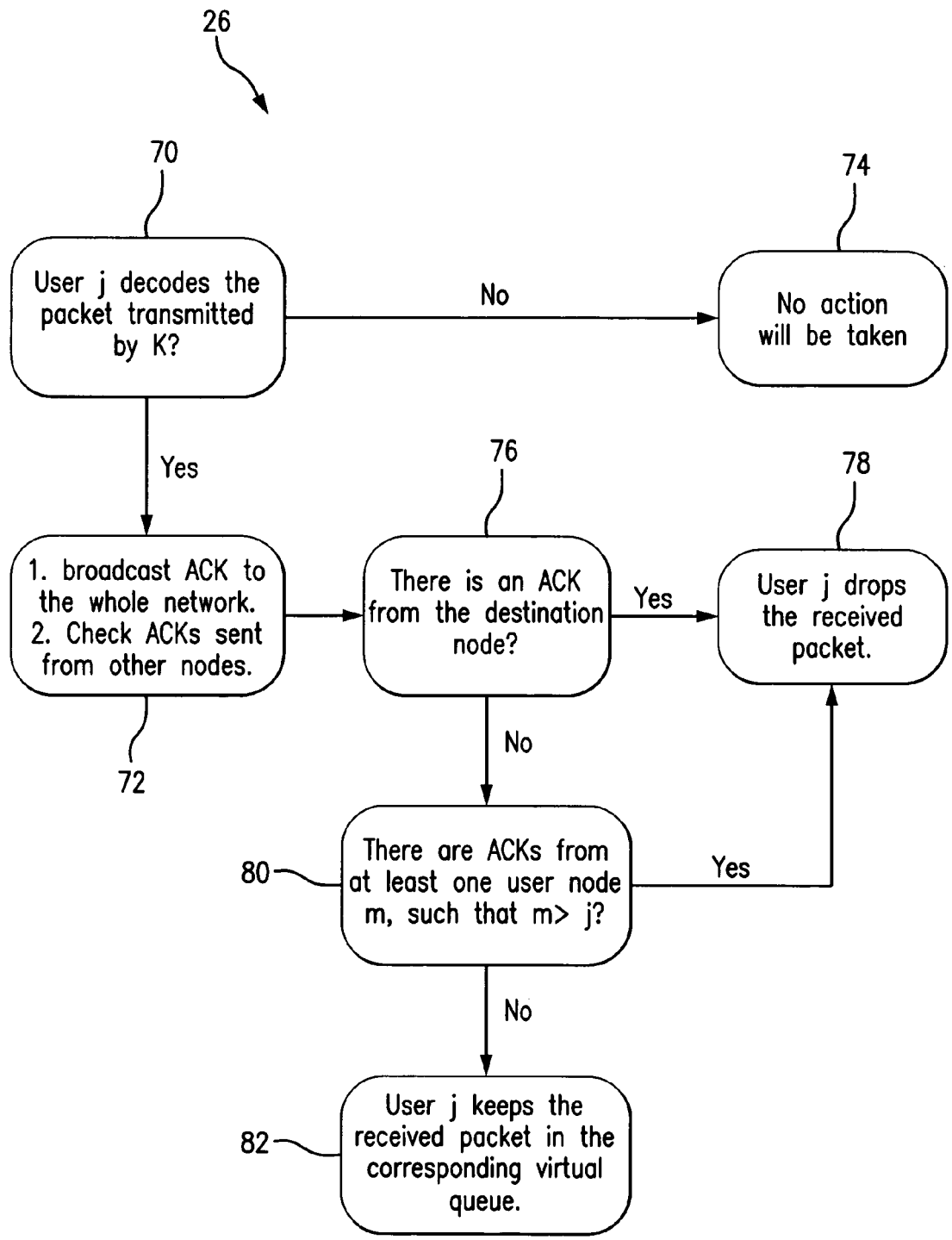
FIG. 5 is a flow chart diagram representing decisions and actions taken by the source user node j as instructed by the Cooperative Operation Controller upon receipt of the packet transmitted by the source user node i.

Referring to FIG. 5, upon transmission of the packet by the source user node K, the following actions and decisions are performed at user node j, for $K+1 \leq j \leq N$:

If user j does not decode the packet successfully in block 70, the logic instructs the source user node j to take no actions in block 74. However, if in block 70, the source user node j decodes the packet successfully, user j in block 72 will first broadcast an acknowledgement to the entire network. Then, user j will decide whether to drop or keep the decoded packet according to the following criterion:

User j checks in block 76 if there is at least one ACK sent by either the destination node, or, as instructed in block 80, from a node with a higher channel rank than j. If so, user j is instructed in block 78 to drop the decoded packet. If not, the user j then is instructed in block 82 to keep the packet in the corresponding virtual queue for retransmission at a later time.

The acknowledgements (ACKs) are assumed to be error-free and broadcast to the entire network. Considering that only one bit is needed by each ACK to indicate successful reception, the cooperation overhead is negligible and the assumption of instantaneous and error-free acknowledgement is reasonable.

If more than one source user node j have similar channel ranks, the controller unit 26 along with the Priority Establishing and Ranking mechanisms 34, 35 make decisions based on additional criteria, for example, fullness of the queues and appoint the node for transmission which is best positioned for this purpose.

Cooperative Communication Policies

At the Medium Access Control (MAC) layer the conflict-free work-conserving policy and TDMA policy have been considered regarding the issue of which node to transmit as presented in previous paragraphs. The MAC Layer of the OSI reference model is used to coordinate the sending of data between computers, and is basically concerned with hardware addressing. These are centralized MAC policies, and hence are not very practical to be implemented in real networks. However, the results presented herein may serve as the baseline for designing more practical policies, and may provide an upper performance bound to the latter. Together with the subject cooperation system and method of the present invention the cooperative communication policies are described as follows:

Work-Conserving Cooperative Communication Policy

A policy is defined to be conflict-free work-conserving if it holds that:
(1) It does not idle the time slot whenever there are packets in the system; and
(2). At most, one backlogged source user node transmits in each time slot.

Therefore, the source user nodes can access the channel via countless disciplines as long as they do not violate any of the above-listed conditions. This is an unspecified policy. It will be shown in further paragraphs that any conflict-free work-conserving policy yields the same stable throughput region.

When a backlogged node k accesses the channel, it may randomly pick up a packet from its queue for transmission. The packet may be its own packet, or a packet it relays for any of its "predecessor" nodes e.g., nodes with a lower ranking.

If the destination node receives the packet successfully, it sends back an ACK signal, and the packet is removed from the system.

If the destination fails to receive the packet, but there is at least one source user node in the set $\{k+1, k+2, \ldots, N\}$ that decodes the packet, the source user node with the largest rank index (e.g., having a best probability of the successful delivery of the packet to the destination node) queues the packet. Then all other source user nodes drop (disregard) the packet.

If none of the source user nodes from (k+1) up to (N+1) decodes the packet, the packet remains in the queue of the source user node k for retransmission.

TDMA-Based Cooperative Communication Policy

Source user nodes access the channel via a TDMA-based schedule, where each source user node is allocated a fraction of time in each frame to access the channel.

Let $\Omega = (\omega_1, \omega_2, \ldots, \omega_N)$ denote the resource-allocation vector for the N nodes, all feasible resource-allocation vectors should satisfy $$\sum_{i=1}^{N} \omega_i \leq 1.$$

At the beginning of the source user node k's assigned time slot, the source user node k transmits a packet from its queue if it is backlogged. If the queue of the source use node k is empty, the slot is not utilized.

If the destination receives the packet successfully, the packet is removed from the system.

If the destination fails to receive the packet, then, if there are some source user nodes among k's subsequent source user nodes that decode the packet, only the source user node with the largest rank index among them queues the packet for retransmission.

If none of the source user nodes from (k+1) up to (N+1) decodes the packet, the packet remains in the queue of the source user node k for retransmission.

Stable Throughput Region

The stable throughput region has been characterized under the proposed cooperative communication policies, starting with the definition of queuing stability.

A. Queuing Stability

Let $X_k^t$ denote number of arrivals in slot t to queue k, and $Y_k^t$ denote departures from queue k. The queue length evolution of queue k has the following form $$Q_k^{t+1} = [Q_k^t - Y_k^t]^+ + X_k^t \tag{Eq. 2}$$

As defined in W. Szpankowski, "Stability conditions for some distributed systems: Buffered random access systems," Adv. Appl. Probab., vol. 26, pp. 498-515, 1994, queue k is stable if $$\lim_{t \to \infty} P[Q_k^t < x] = F(x) \tag{Eq. 3}$$

The system is stable if and only if all the queues are stable. Under the subject model, the queue length vector $Q^t = \{Q_1^t, Q_2^t, \ldots, Q_N^t\}$ forms an irreducible, aperiodic Markov chain. Queuing stability is equivalent to the positive recurrence of the Markov chain.

An important tool to determine stability is Loynes' Theorem, which states that, if the arrival and service processes of a queue are jointly stationary, the queue is stable if and only if the average arrival rate is strictly less than the average service rate. The criterion in D. Bertsekas, et al., "Data Network", $2^{nd}$ ed. Englewood Cliffs, N.J., Prentice-Hall, 1992, has been used which establishes that in a work-conserving system, the system is stable if the proportion of time the system is busy is less than 1. The stable throughput region has been characterized as the union of all sets of arrival rate vectors $(\lambda_1, \lambda_2, \ldots, \lambda_N)$ such that all queues in the system remain stable. Under the TDMA-based policy, the stable throughput region is obtained as the set of all arrival rates $(\lambda_1, \lambda_2, \ldots, \lambda_N)$ such that there exists $(\omega_1, \omega_2, \ldots, \omega_N)$ which stabilizes the system.

B. Main Results

The main results are outlined with respect to the stable throughput analysis. Proofs of the following Theorems 1 and 2, as well as proofs of Propositions 1 and 2, may be found in B. Rong and A. Ephremides. "Protocol-Level Cooperation "Wireless Networks: Stable Throughput and Delay Analysis".

Theorem 1:

$\Lambda = (\lambda_1, \lambda_2, \ldots, \lambda_N)$ is the Bernoulli arrival rate vector. The stable throughput region under both the work-conserving and TDMA-based cooperative communication policies is the same, and is characterized by:

$$\mathfrak{R} = \left\{ \Lambda : \sum_{k=1}^{N} \frac{r_k}{\prod_{i=k+1}^{N+1}(1-p_{k,i})} < 1 \right\} \text{ where} \quad \text{(Eq. 4)}$$

$$r_1 = \lambda_1 \quad \text{(Eq. 5)}$$

$$r_k = \lambda_k + \sum_{i=1}^{k-1} \frac{\left(p_{i,k} \sum_{m=k+1}^{N+1}(1-p_{i,m})\right) r_i}{1 - \prod_{j=i+1}^{N+1}(1-p_{i,j})} k \in [2, N]$$

Theorem 2:

Nodes in the network are ordered such that $p_{N, N+1} > P_{N-1, N+1} > \ldots > p_{1, N+1}$. With such ordering, the stable throughput region of the cooperative system strictly contains the stable throughput region when cooperation is not used. The maximum stabilizable arrival rates of nodes from 1 up to (N−1) strictly increase, while the maximum stabilizable arrival rate of node N remains unaffected.

Delay an Analysis

It is known that delay analysis of more than two interacting queues is next to impossible. Thus, the effort has been focused on the case of two users. M. Sidi, et al., in "Two interfering queues in packet-radio networks", IEEE Trans. Commun., vol. Com-31. No. 1, pp. 123-129. January 1983, analyzed delay of interfering queues in packet-radio networks under the collision channel model. The technique relies on solving the moment-generating function of the joint stationary queue lengths. From Theorem 1, it is seen that any conflict-free work-conserving policy yields the same stable throughput region. However, the delay performance depends on specific work-conserving policy. Therefore, the delay performance of the TDMA policy, as well as a special work-conserving policy, e.g., priority-based policy are investigated. The priority rule assigns higher priority to class-1 packets. First, this priority-based cooperative communication policy is described in the two-user case shown in FIG. 6:

Source user node 12 has a higher priority than source user node 14 to access the channel. When the source user node 12 is backlogged, it transmits a packet. If the destination node 22 decodes the packet, the packet exits the system. Otherwise, if the source user node 14 decodes the packet, the source user node 14 queues the packet for retransmission and the source user node 12 drops the packet. If neither the source user node 14 nor the destination node 22 decodes the packet, the packet remains at user 12.

When the source user node 12 is empty, then the source user node 14 accesses the channel. If there are both class-1 and class-2 packets in its queue, the source user node 14 picks up a packet belonging to class 1 and transmits that packet first. If there are only class-2 packets, the source user node 14 transmits a packet of class 2. If the packet is successfully decoded by the destination node 22, the packet exits the system. Otherwise, the packet stays in the queue at the source user node 14.

It is assumed that on a control sub-channel 90, source user nodes 12 and 14 share their queue status information in order for this policy to be implementable. According to the stated priority-based cooperative policy, there are three queues involved in analysis, as shown in FIG. 6:

1) $Q_1$ at the node 12 which contains the packets generated by the source user node 12 itself;

2) $Q_{21}$ at the node 14 which contains the packets that are relayed from the source user node 12;

3) $Q_{22}$ at the node 14 which contains the packets generated by the source user node 14 itself.

$Q_{21}$ and $Q_{22}$ are merged at the node 14 and are denoted by $Q_2$. For the system shown in FIG. 6 the following Proposition has been attained:

Position 1:

Under the priority-based cooperative communication policy, if the system is stable.

(a) The average delay of class-1 packet is given by $$D_1 = \frac{N_1 + N_{21}}{\lambda_1} \quad \text{(Eq. 6)}$$

(b) The average delay of class-2 packet is given by $$D_2 = \frac{N_2 - N_{21}}{\lambda_2} \quad \text{(Eq. 7)}$$

where,

1) $N_1$, the average queue length of $Q_1$, is given by $$N_1 = \frac{-\lambda_1^2 + \lambda_1}{p_{1,2} + p_{1,3} - p_{1,2} p_{1,3} - \lambda_1} \quad \text{(Eq. 8)}$$

2) $N_{21}$, the average queue length of $Q_{21}$, is given by $$N_{21} = \frac{f \lambda_1^2 + g \lambda_1}{a \lambda_1^2 + b \lambda_1 + c} \text{ with} \quad \text{(Eq. 9)}$$

$$f = (p_{1,2} - p_{1,2} p_{1,3}) \quad \text{(Eq. 10)}$$

$$\left( \frac{p_{2,3} - p_{1,3}}{p_{1,2} + p_{1,3} - p_{1,2} p_{13}} - p_{1,2} - p_{2,3} + p_{1,2} p_{1,3} \right)$$

$$g = (p_{1,2} - p_{1,2} p_{1,3})(p_{1,2} + p_{1,3} - p_{1,2} p_{1,3})$$

$$a = p_{1,2} + p_{2,3} - p_{1,2} p_{1,3}$$

$$b = (p_{1,2} + p_{1,3} - p_{1,2} p_{1,3})(-p_{1,2} - 2p_{2,3} + p_{1,2} p_{1,3})$$

$$c = p_{2,3}(p_{1,2} + p_{1,3} - p_{1,2} p_{1,3})^2$$

3) $N_2$, the average queue length of $Q_2$, is given by $$N_2 = \frac{AD - BC}{D - B} \text{ with} \quad \text{(Eq. 11)}$$

-continued $$A = \frac{-\lambda_1^2 - \lambda_2^2 + \lambda_1 + \lambda_2 - \lambda_1\lambda_2}{p_{1,3} - \lambda_1 - \lambda_2} + \frac{\lambda_1^2 - \lambda_1}{p_{1,2} + p_{1,3} - p_{1,2}p_{1,3} - \lambda_1}$$ (Eq. 12)

$$B = \frac{p_{1,3} - p_{2,3}}{p_{1,3} - \lambda_1 - \lambda_2}$$

$$C = \frac{-\lambda_2^2 + \lambda_2 + \frac{p_{1,2} - p_{1,2}p_{1,3}}{p_{1,2} + p_{1,3} - p_{1,2}p_{1,3}}\lambda_1}{-\lambda_2 - p_{1,2} + p_{1,2}p_{1,3}}$$

$$D = \frac{-p_{1,2} - p_{2,3} + p_{1,2}p_{1,3}}{-\lambda_2 - p_{1,2} + p_{1,2}p_{1,3}}$$

Under the TDMA-based cooperative communication policy, when the network is stable, the analytical delay expressions are derived as functions of the reception probabilities as well as the allocation vector ($\omega_1$, $\omega_2$). Among all allocation vectors that stabilized the system, the optimal allocation vector ($\omega^*_1$, $\omega^*_2$) is solved that minimizes the average delay over all packets. The minimum average delay is given in the following Proposition:

Proposition 2:

Under the TDMA-based cooperative communication policy, if the network is stable, the minimum average delay over all packets that can be achieved by the optimal ($\omega^*_1$, $\omega^*_2$) is:

$$D^*_{Avg}(TDMA) = \frac{\left(\sqrt{b_1(-r_2^2 + r_2 + \alpha\lambda_1\lambda_2)} + \sqrt{b_2(-r_1^2 + r_1)}\right)^2}{(\lambda_1 + \lambda_2)(b_1b_2 - b_1r_2 - b_2r_1)}$$ (Eq. 13)

with ($\omega^*_1$, $\omega^*_2$), the average delay of class-1 packet is $$D_1(TDMA)$$ (Eq. 14)

$$|(\omega^*_1, \omega^*_2) = \frac{(-r_1 + 1)\left(b_2\sqrt{\frac{b_1b_2((-r_2^2 + r_2 + \alpha\lambda_1\lambda_2))}{(-r_1^2 + r_1)}}\right)}{b_1b_2 - b_1r_2 - b_2r_1} +$$

$$\frac{\alpha(-r_2^2 + r_2 + \alpha\lambda_1\lambda_2)\left(b_1 + \sqrt{\frac{b_1b_2(-r_1^2 + r_1)}{-r_2^2 + r_2 + \alpha\lambda_1\lambda_2}}\right)}{r_2(b_1b_2 - b_1r_2 - b_2r)}$$

the average delay of class-2 packet is:

$$D_2(TDMA)|(\omega^*_1, \omega^*_2) =$$ (Eq. 15)

$$\frac{(-r_2^2 + r_2 + \alpha\lambda_1\lambda_2)\left(b_1 + \sqrt{\frac{b_1b_2(-r_1^2 + r_1)}{-r_2^2 + r_2 + \alpha\lambda_1\lambda_2}}\right)}{r_2(b_1b_2 - b_1r_2 - b_2r_1)} \text{ with}$$

$$r_1 = \lambda_1$$ (Eq. 16)

$$r_2 = \frac{p_{1,2}(1 - p_{1,3})}{p_{1,2} + p_{1,3} - p_{1,2}p_{1,3}}\lambda_1 + \lambda_2$$

$$b_1 = 1 - (1 - p_{1,2})(1 - p_{1,3})$$

$$b_2 = p_{2,3}$$

$$\alpha = \frac{p_{1,2}(1 - p_{1,3})}{p_{1,2} + p_{1,3} - p_{1,2}p_{1,3}}$$

Results

Figure 7:
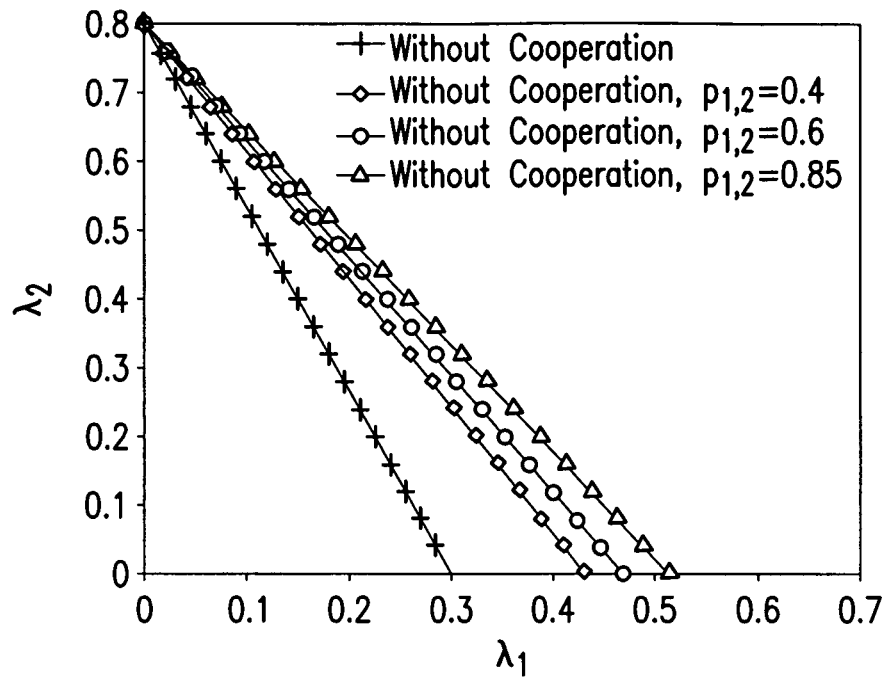
FIG. 7 is a diagram representing comparison of the stable throughput regions under cooperative and non-cooperative policies.

In FIG. 7, the stable throughput regions of the cooperative policies are compared with the non-cooperative policies in the two-user case shown in FIG. 6. In this plot, the reception probabilities of the user-destination channels are chosen to be $p_{1,3}=0.3$, $p_{2,3}=0.8$. For the inter-user channel three channel conditions were studied with reception probabilities: $p_{1,2}=0.4$, 0.6, 0.85 (note that $p_{1,2}$ affects the performance of the cooperative case only). The stable throughput region of the cooperative policies is found to strictly contain the non-cooperative policies, and the region increases as the inter-user channel condition improves.

Figure 8:
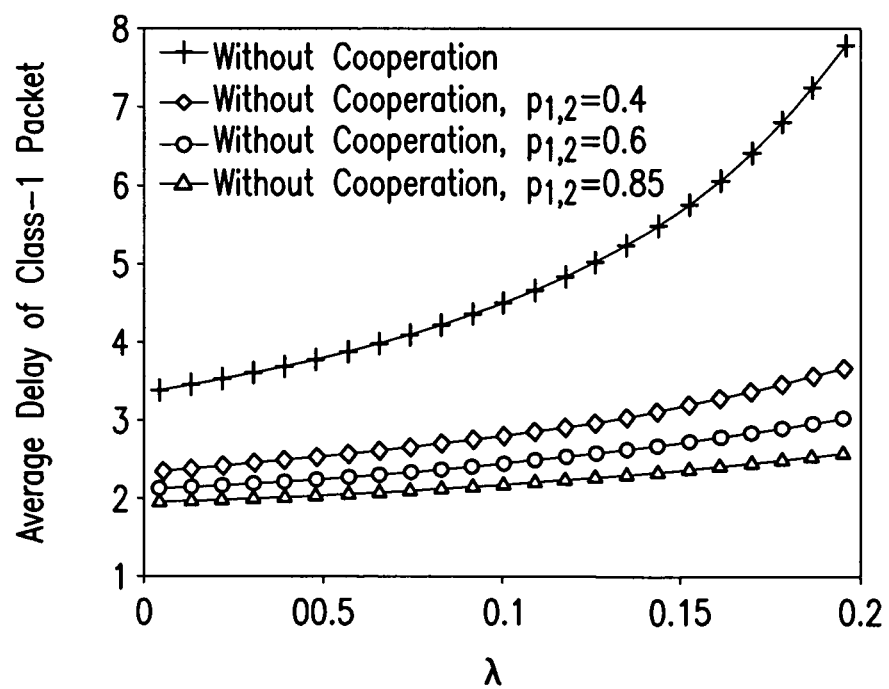
FIG. 8 is a diagram representing comparison of the i-class packet delay under cooperative and non-cooperative priority-based policy.
Figure 9:
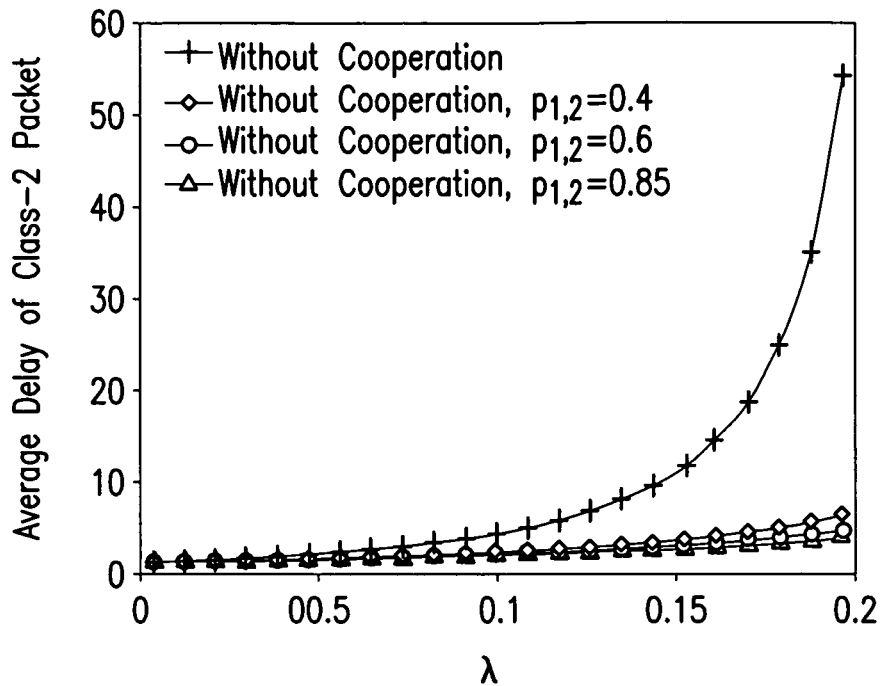
FIG. 9 is a diagram representing comparison of the j-class packet delay under cooperative and non-cooperative priority-based policies.

The benefit of cooperation in delay performance for class-1 packets and class-2 packets respectively, under the priority-based policy is demonstrated in FIGS. 8 and 9. The channel reception probabilities are the same as described above. Using the same technique, the delay performance under the non-cooperative priority-based policy is derived as:

(a) The average delay of class-1 packet is:

$$D_1|\text{non-cooperative} = \frac{-\lambda_1 + 1}{p_{1,3} - \lambda_1}$$ (Eq. 17)

(b) The average delay of class-2 packet is:

$$D_2|\text{non-cooperative} =$$ (Eq. 18)

$$\frac{(-p_{1,3} + p_{2,3} - p_{1,3}p_{2,3})\lambda_1 - p_{1,3}^2\lambda_2 + p_{1,3}\lambda_1\lambda_2 + p_{1,3}^2}{(p_{2,3}\lambda_1 + p_{1,3}\lambda_2 - p_{1,3}p_{2,3})(\lambda_1 - p_{1,3})}$$

$\lambda_1 = \lambda_2 = \lambda$ and $\lambda$ varies to obtain the presented plots. It has been shown that when cooperation is used, both class-1 and class-2 packets experience less average delay. And when the inter-user channel quality improves, cooperation leads to more performance gains to both users.

Figure 10:
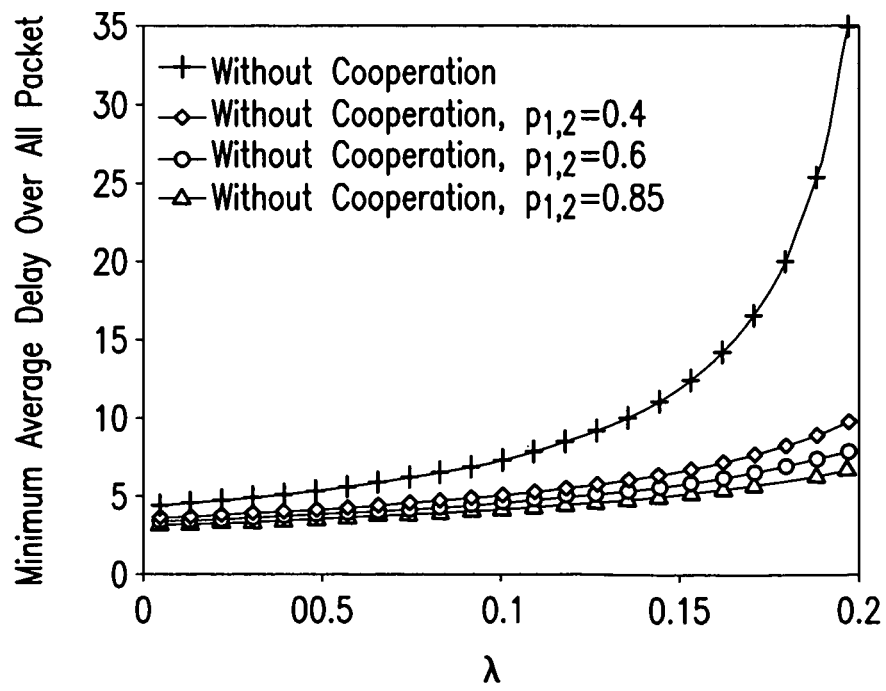
FIG. 10 is a diagram representing comparison of the minimum overall average delay under cooperative and non-cooperative TDMA-based policies.
Figure 11:
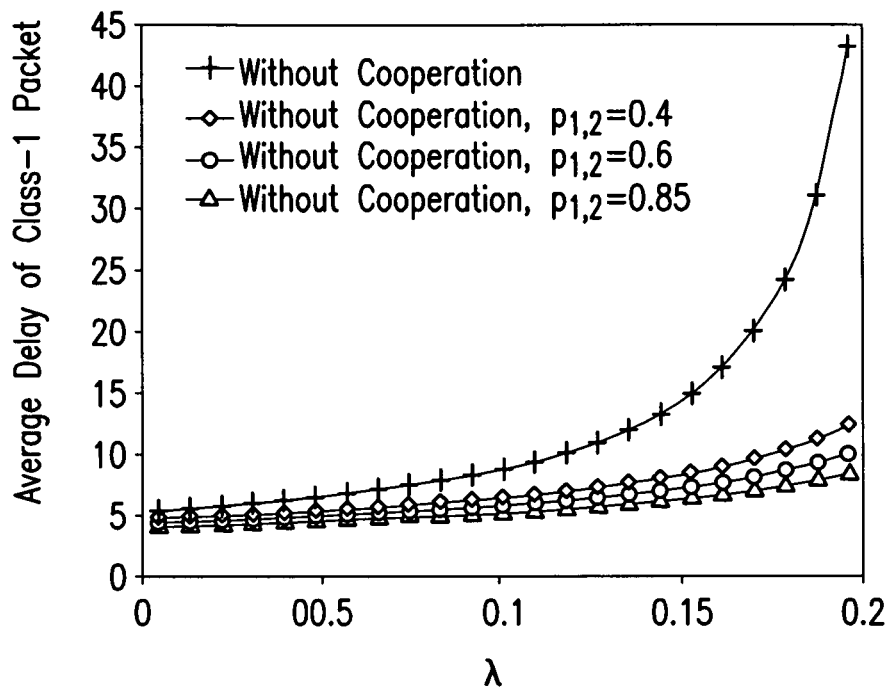
FIG. 11 is a diagram representing comparison of the i-class packet delay under cooperative and non-cooperative TDMA-based policies.
Figure 12:
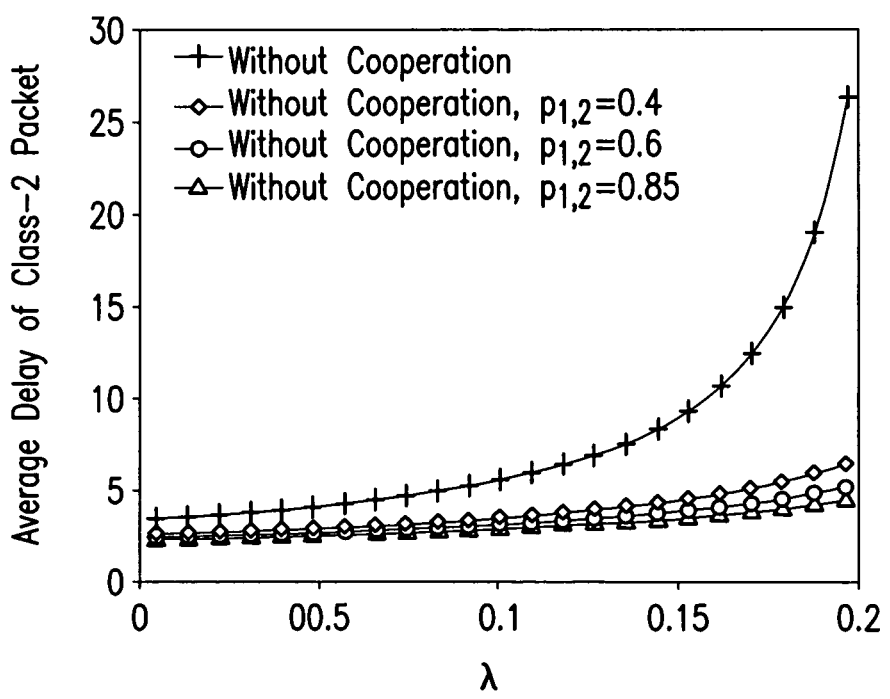
FIG. 12 is a diagram representing comparison of the j-class packet delay under cooperative and non-cooperative TDMA-based policies.

The benefit of cooperation in terms of delay performance under the TDMA-based communication policy is presented in FIGS. 10-12. Using the same technique, the minimum overall delay achievable under the non-cooperative TDMA-based policy is:

$$D^*_{Avg}(TDMA)|\text{non-cooperative} =$$ (Eq. 19)

$$\frac{1}{\lambda_1 + \lambda_2}\left[\frac{\left(\sqrt{p_{1,3}\lambda_2(1 - \lambda_2)} + \sqrt{p_{2,3}\lambda_1(1 - \lambda_1)}\right)^2}{p_{1,3}p_{2,3} - p_{1,3}\lambda_2 - p_{2,3}\lambda_1}\right]$$

Meanwhile the average delay of class-1 packet and class-2 packet are given by $$D_1(TDMA)$$ (Eq. 20)

$$|\text{non-cooperative} = \frac{1 - \lambda_1\left(p_{2,3} + p_{1,3}\sqrt{\frac{p_{2,3}\lambda_2(1 - \lambda_2)}{p_{1,3}\lambda(1 - \lambda_1)}}\right)}{p_{1,3}p_{2,3} - p_{1,3}\lambda_2 - p_{2,3}\lambda_1}$$

$$D_2(TDMA)$$ (Eq. 21)

$$|\text{non-cooperative} = \frac{1 - \lambda_2\left(p_{1,3} + p_{2,3}\sqrt{\frac{p_{1,3}\lambda_1(1 - \lambda_1)}{p_{2,3}\lambda(1 - \lambda_2)}}\right)}{p_{1,3}p_{2,3} - p_{1,3}\lambda_2 - p_{2,3}\lambda_1}$$

FIG. 10 shows that the minimum overall delay achieved by the cooperative TDMA policy is strictly less than that by the non-cooperative TDMA policy. It is also seen that the delay for both the class-1 packet and class-2 packet improves over that of the non-cooperative case, as illustrated in FIGS. 11 and 12. A better inter-user channel helps reduce delay under the cooperative communication policy.

The cooperation among the sets of users at the Network Protocol Layer level in a wireless multi-access system attains the higher stable throughput for all users in the network simultaneously. Results of the analysis for the delay performance indicate that users may experience reduced average delay when cooperation is used. In lieu of the subject cooperative transmission, it is possible to consider more general system models which allow simultaneous transmissions and multi-packet reception. The subject system and method may be extended also to include diverse traffic demands (unicast, multicast, broadcast) and more general network topologies. It is possible to consider different network-level cooperation disciplines through a cross-layer, as shown in FIG. 1, and confirm the expectation that performance would improve.

It is contemplated in the scope of the present invention that a cross-connection between the subject cooperative strategy implemented on the network protocol layer and other layer, e.g. Physical Layer, Data Line Layer (LIC and MAC), Transport Layer, Session Layer, Presentation Layer, and Application Layer may be designed to further benefit performance characteristics of the wireless multi-access networks.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is being claimed is:

1. A method for cooperative transmission in wireless multi-hop networks, comprising the steps of:
    (a) forming a wireless multi-access system including a plurality N of source user nodes, each connected to a destination node N+1 via a respective wireless communication channel to unicast therethrough respective packets to said destination node N+1, wherein N is a number of the source user nodes in said plurality thereof, said number N=1, 2, 3, N−1, N, wherein said plurality N of the source user nodes include at least one source user node i generating at least one i-class packet and at least one source user mode j generating at least one j-class packet, where i=1, 2, ..., N−1, and wherein j=i+1, i+2, ..., N, and wherein said at least one source user node j, in addition to generating said at least one j-class packet is configured with capabilities to relay said at least one i-class packet, and
    (b) cooperatively operating said wireless multi-access system at a protocol layer level thereof by the steps of:
    (c) transmitting said at least one i-class packet from said at least one source user node i to said destination node N+1 via the wireless communicating channel i,
    (d) broadcasting acknowledgement (ACK) signal by at least one of said destination node N+1 and said at least one source user node j upon successful receipt of said at least one i-class racket of said at least one source user node i at a single time slot with said transmitting of said at least one i-class packet from said at least one source user node i, and
    (e) if said destination node N+1 fails to successfully receive said at least one i-class packet from said at least one source user node i, and if said at least one source user node j successfully received said i-class packet of said at least one source user node i, transmitting said at least one i-class packet from said at least one source user node j to said destination node N+1 via a wireless communication channel j of said at least one source user node j in lieu of said at least one j-class packet generated thereat, wherein said wireless communication channel j of said at least one source user node j has a higher successful delivery probability than said wireless communication channel i of said at least one source user node i.

2. The method of claim 1, further comprising the step of:
    after said step (c), receiving said i-class packet of said at least one source user node i at said source user node j inadvertently.

3. The method of claim 1, further comprising the steps of:
    generating said at least one i-class packet at said at least one source user node i, with a rate $\lambda i$, generating said at least one j-class packet at said at least one source user node j, and queuing said at least one i-class and said at least j-class packet for transmission from said at least one source user nodes i and j, respectively, with a predetermined positive probability.

4. The method of claim 3, further comprising the steps of:
    providing said at least one source user node i with a queue containing said at least one i-class packet.

5. The method of claim 1, further comprising the steps of:
    discarding said at least one i-class packet at said at least one source user node i and at said at least one source user node j upon receipt of said ACK signal from said destination node N+1.

6. The method of claim 1, further comprising the step of:
    discarding said at least one i-class packet at said at least one source user node i upon receipt of said ACK signal from said at least one source user node j.

7. The method of claim 1, further comprising the step of:
    if in said step (e), said at least one source user node j fails to successfbIly receive said at least one i-class packet of said at least one source user node i, retaining said at least one i-class packet at said at least one source user node i for retransmission to said destination node N+1.

8. The method of claim 1, wherein said at least one source user node j includes a plurality of said source user nodes j, said method further comprising the steps of:
    in said step (e), receiving said at least one i-class packet transmitted by said at least one source user node i at said plurality of source user nodes j,
    choosing among said plurality of said source user nodes j a source user node n having the wireless communication channel n with the highest successful delivery probability, and
    transmitting said at least one i-class packet from said source user node n to said destination node N+1.

9. A method for cooperative transmission in wireless multi-hop networks, comprising the steps of:
    (a) forming a wireless multi-access system including N source user nodes each connected to a destination node N+1 via a respective wireless communication channel to unicast therethrough respective packets to said destination node N+1, wherein N=1, 2, 3, ..., N−1, N;
    (b) cooperatively operating said wireless multi-access system at the protocol layer level thereof by, the steps of:
    (c) generating at least One i-class packet at said at least one source user node i with a rate $\lambda i$, and transmitting said at least one i-class packet from at least one source user node i to said destination node N+1 via the wireless communicating channel i, where i=1, 2, . . . , N−1:

(d) if said destination node N+1 fails to successfully receive said i-class packet from said at least one source user node i, and if at least one source user node j successfully received said at least one i-class packet of said at least one source user node i, transmitting said at least one i-class packet from said at least one source user node j to said destination node N+1 via a wireless communication channel j of said at least one source user node j, wherein j=i+1, i+2, . . . , N, wherein said wireless communication channel j of said at least one source user node j has a higher successful delivery probability than said wireless communication channel i of said at least one source user node i;

(e) providing said at least one source user node i with a queue containing said at least one i-class packet;

(f) generating at least one j-class packet at said at least one source user node j, and providing said at least one source user node j with a queue containing said at least one j-class packet, and with at least one i-queue containing said at least one i-class packet of said at least one source user node i, and (g) queuing said at least one i-class packet and said at least one j-class packet for transmission from said at least one source user nodes i and j, respectively, wherein said at least one source user node i and said at least one source user node j access said wireless communication channel i and j, respectively, in accordance with a Time-Division-Multiple-Access (TDMA)-based schedule, wherein each of said at least one source user node i and said at least one source user node j are allocated a respective time slot, and wherein said allocated respective slot is idled if a respective queue of said at least one source user node j or j is empty.

10. The method of claim 9, further comprising the steps of:
in said step (d), randomly choosing one of said at least one i-class packet or said at least one j-class packet from said j-queue and said at least one i-queue of said at least one source user node j for transmission from said at least one source user node j to said destination node N+1.

11. The method of claim 10, wherein said at least one of said source user nodes i and j access said wireless communication channels i and j, respectively, in a work-conserving conflict-free fashion if said multi-access system provides a time slot whenever there is at least one i-class car j-class packet for transmission, and if at most one of said source user nodes i and j transmits at said time slot.

12. The method of claim 9, further comprising the steps of:
in said stop (d), assigning higher priority to said at least one i-class packet in said at least one i-queue over said at least one j-class packet in said j queue of said at least one source user node j.

13. The method of claim 12, further comprising the steps of:
assigning a higher priority to said at least one source user node i for transmitting said at least one i-class packet over said at least one source user node j for transmitting said at least one j-class packet.

14. The method of claim 9, further comprising the step of:
exchanging, between said at least one source user nodes i and j, the information on a status of said queue containing said at least one i-class packet of said at least one source unit node and on a status of said j queue and said at least one i queue of said at least one source user node j.

15. A wireless multi-hop network system with stable throughput and improved delay performance, comprising:
a wireless multi-access system of a plurality N of source user nodes, each connected to a destination node N+1 via a respective wireless communication channel to unicast thereto respective packets, wherein N is a number of the source user nodes in said plurality thereof, said number N=1, 2, 3, . . . , N−1, N, and a cooperative scheduling controller unit implemented at a protocol layer level of said wireless multi-access system and coupled to said plurality N of source user nodes and said destination node N+1, wherein said plurality of N source user nodes includes at least one source user node i generating and transmitting to said destination node N+1 at least one i-class packet, and at least one source user node j generating and transmitting to said destination node N+1 at least one j-class packet, and wherein said at least one source user node j, in addition to generating said at least one j-class packet, is configured with capabilities to relay said at least one i-class packet, wherein i=1, 2, . . . , N−1, wherein j=i+1, . . . , N, and wherein a wireless communication channel j of said at least one source user node j has a higher successful delivery probability than the wireless communication channel i of said at least one source user node i, said cooperative scheduling unit controller instructing said at least one source user node j to transmit said at least one i-class packet to said destination node N+1 via said wireless communication channel j, if said destination node N+1 fails to successfully receive said at least one i-class packet from said at least one source user node i via said wireless communication channel i, and an acknowledgement (ACK) mechanism for broadcasting a respective ACK signal upon successful receipt of said at least one i-class packet or said at least one j-class packet at a single time slot with said transmitting of at least one respective one of said at least one i-class packet and j-class packet.

16. The wireless multi-hop network system of claim 15, wherein said ACK mechanism includes an ACK transmitter of said at least one source user node j and said destination node N+1 for broadcasting a respective ACK signal upon successful receipt of said at least one i-class packet and said at least one j-class packet thereof; and a receiver at said at least one source user node i and said at least one source user node j for receiving said broadcasted ACK signals.

17. The wireless multi-hop system of claim 15, wherein if at least two said source nodes j successfully received said i-class packet, said cooperative scheduling controller unit appointing a single source user node j to unicast said i-packet to said destination node N+1.

18. The wireless multi-hop network system of claim 17, wherein said cooperative scheduling controller unit includes a ranking unit operatively coupled to said at least two source user nodes j to make a decision on said appointment based on criteria selected from a group consisting of; successful delivery probability of the wireless communication channel, fullness of the queues, and combinations thereof.

19. The wireless multi-hop system of claim 15, wherein said cooperative scheduling controller unit implemented at said protocol level layer is interconnected with scheduling and ranking mechanisms implemented at least at one of the Physical Layer level, and Media Access Control (MAC) Layer level.

20. A wireless multi-hop network system, with stable throughput and improved delay performance, comprising,
a wireless multi-access system of a plurality N of source user nodes, each connected to a destination node N+1 via a respective wireless communication channel to unicast thereto respective packets, wherein N is a number of the source user nodes in said plurality thereof, said number $N=1, 2, 3, \ldots, N-1, N$, and
a cooperative scheduling controller unit implemented at a protocol layer level of said wireless multi-access system and coupled to said plurality N of source user nodes and said destination node N+1,
wherein said plurality of N source user nodes includes at least one source use node i generating and transmitting to said destination node N+1 at least one i-class packet, and at least one source user node j generating and transmitting to said destination N+1 at least one j-class packet,
wherein $i=1, 2, \ldots, N-1$, wherein $j=i+1, \ldots, N$, and wherein the wireless communication channel of said at least one source user node has a higher successful delivery probability than the wireless communication channel i of said at least one source user node i,
said cooperative scheduling unit controller instructing said at least one source user node j to transmit said at least one i-class packet to said destination node N+1 via said wireless communication channel j, if said destination node N+1 fails to successfully receive said at least one i-class packet from said at least one source user node i via said wireless communication channel i,
wherein said at least one source user node j has at least one i-queue unit with a predetermined capacity to accumulate said at least one i-class packet transmitted by said at least one source unit node i and inadvertently successfully received at said at least one source user node j, and a dedicated queue storing said at least one j-class packet generated by said at least one source user node j.

21. The wireless multi-hop network system of claim 20, wherein said cooperative scheduling controller unit is operatively coupled to said at least one source user node j to coordinate transmission of said at least one i-class packet and said at least one j-class packet from said at least one i-queue and said at least one j-queue to said destination node N+1 via said wireless communication channel j in accordance with a predefined priority criteria, wherein said criteria is selected from a group of criteria consisting of stable throughput, maximum throughput, system traffic delay, waiting time in said queues of said at least one source user node j, capacity of said queues in said at least one source user node j, overflow threshold class of service, priority policy, and combinations thereof.

* * * * *